(12) United States Patent
Miller et al.

(10) Patent No.: US 7,344,694 B2
(45) Date of Patent: Mar. 18, 2008

(54) UZM-12 AND UZM-12HS: CRYSTALLINE ALUMINOSILICATE ZEOLITIC COMPOSITIONS AND PROCESSES FOR PREPARING AND USING THE COMPOSITIONS

(75) Inventors: Mark A. Miller, Niles, IL (US); Gregory J. Lewis, Mount Prospect, IL (US); Jana L. Gisselquist, Evanston, IL (US); Jaime G. Moscoso, Mount Prospect, IL (US); R. Lyle Patton, Surprise, AZ (US)

(73) Assignee: UOP LLC, Des Plaines, IL (US)

( * ) Notice: Subject to any disclaimer, the term of this patent is extended or adjusted under 35 U.S.C. 154(b) by 680 days.

(21) Appl. No.: 10/959,453

(22) Filed: Oct. 6, 2004

(65) Prior Publication Data

US 2006/0073094 A1    Apr. 6, 2006

(51) Int. Cl.
*C01B 39/30* (2006.01)
(52) U.S. Cl. .................... 423/705; 423/707; 423/708; 423/718; 208/46
(58) Field of Classification Search ................ 423/705, 423/707, 708, 718; 208/46
See application file for complete search history.

(56) References Cited

U.S. PATENT DOCUMENTS 2,950,952 A    11/1960  Bender ................ 33/203.18
3,699,139 A    10/1972  Rubin et al. ............ 260/448 C
4,086,186 A    4/1978   Rubin et al. ................ 252/430
4,503,023 A    3/1985   Breck et al. ................ 423/328
4,931,266 A *  6/1990   Occelli ....................... 423/326

OTHER PUBLICATIONS

Nature, 214, 1005-1006 (1967), Bennett et al.
M.L. Occelli et al. in Zeolites, vol. 7, 265-271 (1987).
Studies in Surface Science and Catalysis, 28, 429-436, Y. Murakami, A. Iljima and J.W. Ward eds., Elsevier, New York, N.Y. (1986).
Zeolites, (1986) 6, 474-483, Lillerud et al.
Studies in Surface Science and Catalysis (1985) 24, 105-110, Veda et al.

* cited by examiner

*Primary Examiner*—David M Brunsman
(74) *Attorney, Agent, or Firm*—Frank S Molinaro

(57) ABSTRACT

A series of crystalline alumino-silicate zeolites identified as UZM-12 have been synthesized. These UZM-12 compositions have the ERI topology, a Si/Al>5.5 and can be prepared as nanocrystallites having an average particle size of about 15 to about 50 nanometers and a spheroidal morphology. The UZM-12 composition can be treated to remove at least a fraction of the framework aluminum atoms thereby providing zeolites with a Si/Al>5.75 and identified as UZM-12HS. Both the UZM-12 and UZM-12HS can catalyze various hydrocarbon conversion processes.

28 Claims, 1 Drawing Sheet

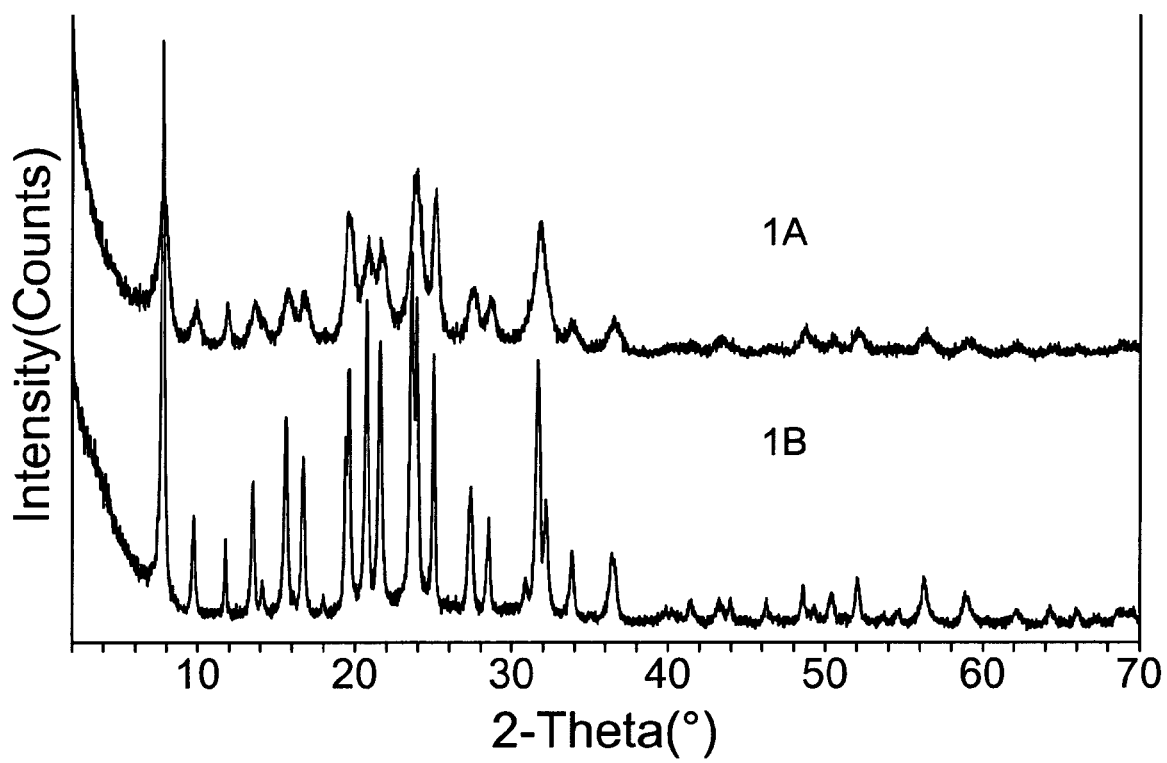

UZM-12 AND UZM-12HS: CRYSTALLINE ALUMINOSILICATE ZEOLITIC COMPOSITIONS AND PROCESSES FOR PREPARING AND USING THE COMPOSITIONS

FIELD OF THE INVENTION

This invention relates to crystalline alumino-silicate zeolites identified as UZM-12. UZM-12 has a Si/Al>5.5, has the ERI topology and can be prepared as nanocrystallites in the 15-50 nanometer range. The UZM-12 zeolites can be treated to remove some of the aluminum from the framework and optionally insert silicon therein.

BACKGROUND OF THE INVENTION

Zeolites are crystalline aluminosilicate compositions which are microporous and which consist of a negatively charged framework formed from corner sharing $AlO_2$ and $SiO_2$ tetrahedra. The negative framework charge is balanced by cations, which usually reside in the pores. Numerous zeolites, both naturally occurring and synthetically prepared are used in various industrial processes. Zeolites are characterized by having pore openings of uniform dimensions, having a significant ion exchange capacity, and being capable of reversibly desorbing an adsorbed phase which is dispersed throughout the internal voids of the crystal without significantly displacing any atoms which make up the permanent zeolite crystal structure.

Offretite (OFF) and Erionite (ERI) are naturally occurring zeolites which at one time were thought to have the same structure. A single crystal electron diffraction study of the two minerals in Nature, 214, 1005-1006 (1967) found that the a and b axes of OFF and ERI were identical, but the C-axis of the ERI structure was twice as long as that in OFF. The researchers also found that synthetic zeolite T, first disclosed in U.S. Pat. No. 2,958,952, was an intergrowth of these two structures.

There are a number of other references which disclose materials that are intergrowth of OFF and ERI. U.S. Pat. No. 3,699,139 discloses the use of benzytrimethylammonium ion to synthesize an OFF/ERI intergrowth. U.S. Pat. No. 4,086,186 discloses using choline to synthesize ZSM-34 (an intergrowth). M. L. Occelli et al. in Zeolites, Vol. 7, 265-271 (1987) discloses using templates designated DABCO (I) and DABCO (II) to synthesize OFF/ERI intergrowth zeolites. Electron diffraction studies by another author on materials prepared with DABCO (I) and DABCO (II) (using the method of Occelli et al) showed that these were essentially fault-free erionite. See, Studies in Surface Science and Catalysis, 28, 429, Y. Murakami, A. IIjima and J. W. Ward eds., Elsevier, New York, N.Y. 1986. The Si/Al ratio of these erionite materials was stated to be those found in the Occelli reference, which was 5.5. Yet another study reported a TMA-Na—K erionite with Si/Al=4 (Zeolites, (1986) 6, 474-483). Erionite type zeolites were also prepared from highly alkaline solution phase reaction mixtures, attaining a maximum Si/Al ratio of 4.25 in the Na—K-TMA system (Studies in Surface Science and Catalysis (1985) 24, 105-110). Finally, U.S. Pat. No. 4,503,023 discloses zeolites designated LZ-220 which are "more siliceous forms of the prior known mineral erionite and its synthetic analog, zeolite T" (column 19, lines 29-31 of the '023 patent). The Si/Al ratio is stated to be greater than 4. However, as was shown later (see above), zeolite T is an intergrowth of erionite and offretite and the LZ-220 is not pure erionite.

Applicants have succeeded in synthesizing essentially pure erionite with a Si/Al ratio greater than 5.5. The preparation uses an organic template as the major charge balancing cation with alkali or alkaline earth cations being present at sub-stoichiometric levels with respect to Al. Applicants have also been able to modify the crystal morphology to obtain 15-50 nanometer crystals spheroidal in shape versus the needle morphology of both erionite mineral and its known synthetic analog.

SUMMARY OF THE INVENTION

This invention relates to a zeolite with the ERI topology, a process for preparing the zeolite and processes using the zeolite. Accordingly, one embodiment of the invention is a microporous crystalline zeolite having a composition in the as-synthesized form in terms of mole ratios of the elements given by $$M_m^{n+}R_r^{p+}Al_{(1-x)}E_xSi_yO_z \qquad (1)$$

where M is at least one exchangeable cation selected from the group consisting of alkali and alkaline earth metals, "m" is the mole ratio of M to (Al+E) and varies from 0 to about 0.50, R is at least one organo ammonium cation selected from the group consisting of quaternary ammonium cations, protonated amines, protonated diamines, protonated alkanolamines, diquaternary ammonium cations, quaternized alkanolammonium cations and mixtures thereof, "r" is the mole ratio of R to (Al+E) and has a value of about 0.51 to about 3.0, E is an element selected from the group consisting of Ga, Fe, In, Cr, B, and mixtures thereof, "x" is the mole fraction of E and varies from 0 to about 1.0, "n" is the weighted average valence of M and has a value of about +1 to about +2, "p" is the weighted average valence of R and has a value of +1 to about +2, "y" is the mole ratio of Si to (Al+E) and has a value from greater than 5.5 to about 9 and "z" is the mole ratio of O to (Al+E) and has a value determined by the equation:

$$z=(m \cdot n+r \cdot p+3+4 \cdot y)/2;$$

the zeolite characterized in that it has an x-ray diffraction pattern having at least the d-spacings and relative intensities set forth in Table A.

TABLE A

| 2Θ | d (Å) | I/Io (%) |
|---|---|---|
| 7.5-7.99 | 11.78-11.06 | m-vs |
| 9.54-10.06 | 9.26-8.79 | w-m |
| 11.5-12.1 | 7.69-7.31 | w-m |
| 13.25-13.79 | 6.68-6.42 | w-vs |
| 15.35-15.95 | 5.77-5.55 | w-m |
| 16.47-16.99 | 5.38-5.21 | w-m |
| 19.33-19.8 | 4.59-4.48 | m-vs |
| 20.45-20.96 | 4.34-4.23 | w-m |
| 21.31-21.83 | 4.17-4.07 | w-m |
| 23.2-23.9 | 3.83-3.72 | m-vs* |
| 23.55-24.25 | 3.77-3.67 | s-vs* |
| 24.55-25.3 | 3.62-3.52 | m-vs |
| 26.85-27.6 | 3.32-3.23 | w-m |
| 28.15-28.85 | 3.17-3.09 | w-m |
| 31.22-31.94 | 2.86-2.8 | m-vs |
| 33.37-34.15 | 2.68-2.62 | w-m |
| 36.05-36.49 | 2.49-2.46 | w-m* |
| 36.36-36.71 | 2.47-2.45 | w-m* |

*Adjacent peaks can coalesce, showing one peak

Another embodiment of the invention is a process for preparing the above-described zeolites which comprises forming a reaction mixture containing reactive sources of M, R, Al, Si and optionally E and heating the reaction mixture at a temperature of about 80° C. to about 200° C., the reaction mixture having a composition expressed in terms of mole ratios of the oxides of:

$$aM_{2/n}O:bR_{2/p}O:(1-c)Al_2O_3:cE_2O_3:dSiO_2:eH_2O$$

where "a" has a value of 0 to about 1.25, "b" has a value of about 2 to about 120, "c" has a value of 0 to about 1.0, "d" has a value of about 8 to about 60, and "e" has a value of about 40 to about 9000.

A further embodiment of the invention is a modified microporous crystalline zeolite having an empirical composition on an anhydrous basis in terms of mole ratios of the elements of:

$$M1_a^{n+}Al_{(1-x)}E_xSi_{y'}O_{z''}$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from about 0.01 to about 3.5, E is an element selected from the group consisting of gallium, iron, boron, chromium, indium and mixtures thereof, x is the mole fraction of E and varies from 0 to about 1.0, n is the weighted average valence of M1 and has a value of about +1 to about +3, y' is the mole ratio of Si to (Al+E) and is greater than about 5.75 and z'' is the mole ratio of O to (Al+E) and has a value determined by the equation:

$$z''=(a \cdot n+3+4 \cdot y')/2.$$

Another embodiment of the invention is a process for preparing the modified microporous crystalline zeolite described above. The process comprising treating a starting zeolite at treating conditions thereby removing at least a portion of the framework aluminum and optionally inserting silicon into the framework to provide the modified zeolite; the starting zeolite having an empirical formula on an anhydrous basis of:

$$M'_{m'}{}^{n+}R_{r'}{}^{p+}Al_{(1-x)}E_xSi_{y'}O_{z'},$$

where M' is an exchangeable cation selected from the group consisting of ammonium ion, hydrogen ion, alkali metals, alkaline earth metals, rare earth metals and mixtures thereof, n is the weighted average valence of M' and varies from +1 to about +3, m' is the mole ratio of M' to (Al+E) and varies from 0 to about 3.5, R is at least one organoammonium cation selected from the group consisting of protonated amines, protonated diamines, protonated alkanolamines, quaternary ammonium ions, diquaternary ammonium ions, quaternized alkanolammonium ions and mixtures thereof, p is the average weighted valence of the organic cation and varies from about +1 to about +2, r' is the mole ratio of R to (Al+E) and varies from 0 to about 3.5, r'+m'>0, y' is the ratio of Si to (Al+E) and varies from greater than 5.5 to about 9 and z' is the mole ratio of O to (Al+E) and has a value given by the equation:

$$z'=(m' \cdot n+r' \cdot p+3+4 \cdot y')/2.$$

Among the treating steps which can be used are: treatment with a fluorosilicate solution or slurry whereby frnamework aluminum atoms of the starting zeolite are removed and replaced by extraneous silicon atoms; extraction with a weak, strong, or complexing acid; and calcination or steaming followed by ion-exchange or acid extraction.

Yet another embodiment of the invention is a hydrocarbon conversion process using any of the above-described zeolites. More specifically the hydrocarbon conversion process is conversion of cyclic compounds to non-cyclic compounds, i.e. linear or branched compounds.

These and other objects and embodiments will become more apparent after the following detailed description of the invention.

BRIEF DESCRIPTION OF THE DRAWING

The drawing presents x-ray diffraction plots for UZM-12 samples from example 2 (1A) and example 14 (1B).

DETAILED DESCRIPTION OF THE INVENTION

Applicants have synthesized a series of new zeolites designated UZM-12. In its as-synthesized form, the UZM-12 zeolite has a composition on an anhydrous basis that is represented by the formula:

$$M_m^{n+}R_r^{p+}Al_{(1-x)}E_xSi_yO_z \quad (1)$$

where M is an exchangeable cation and is selected from the group consisting of alkali and alkaline earth metals. Specific examples of the M cations include but are not limited to lithium, sodium, potassium, cesium, strontium, calcium, magnesium, barium and mixtures thereof, with potassium being preferred. The value of "m" which is the mole ratio of M to (Al+E) varies from 0 to about 0.50. R is at least one organoammonium cation selected from the group consisting of quaternary ammonium cations, protonated amines, protonated diamines, protonated alkanolamines, diquaternary ammonium cations, quaternized alkanolammonium cations and mixtures thereof. The value of "r" which is the mole ratio of R to (Al+E) varies from about 0.51 to about 3.0. The value of "n" which is the weighted average valence of M varies from +1 to about +2. The value of "p", which is the average weighted valence of the organic cation has a value from about +1 to about +2. E is an element which is present in the framework and is selected from the group consisting of gallium, iron, boron, chromium, indium and mixtures thereof. The value of "x" which is the mole fraction of E varies from 0 to about 1.0. The ratio of silicon to (Al+E) is represented by "y" which varies from greater than about 5.5 to about 9, while the mole ratio of O to (Al+E) is represented by "z" and has a value given by the equation:

$$z=(m \cdot n+r \cdot p+3+4 \cdot y)/2.$$

When M is only one metal, then the weighted average valence is the valence of that one metal, i.e. +1 or +2. However, when more than one M metal is present, the total amount of:

$$M_m^{n+}=M_{m1}^{(n1)+}+M_{m2}^{(n2)+}+M_{m3}^{(n3)+}+\ldots$$

and the weighted average valence "n" is given by the equation:

$$n = \frac{m_1 \cdot n_1 + m_2 \cdot n_2 + m_3 \cdot n_3 + \ldots}{m_1 + m_2 + m_3 \ldots}$$

Similarly when only one R organic cation is present, the weighted average valence is the valence of the single R cation, i.e., +1 or +2. When more than one R cation is present, the total amount of R is given by the equation:

$$R_r^{p+}=R_{r1}^{(p1)+}+R_{r2}^{(p2)+}+R_{r3}^{(p3)+}+\ldots$$

and the weighted average valence "p" is given by the equation:

$$p = \frac{p_1 \cdot r_1 + p_2 \cdot r_2 + p_3 \cdot r_3 + \ldots}{r_1 + r_2 + r_3 + \ldots}.$$

These aluminosilicate zeolites, are prepared by a hydrothermal crystallization of a reaction mixture prepared by combining reactive sources of M, R, aluminum, optionally E and silicon in aqueous media. Accordingly, the aluminum sources include, but are not limited to, aluminum alkoxides, precipitated alumina, aluminum hydroxide, aluminum salts and aluminum metal. Specific examples of aluminum alkoxides include, but are not limited to aluminum orthosec-butoxide, and aluminum orthoisopropoxide. Sources of silicon include but are not limited to tetraethylorthosilicate, fumed silica, precipitated silica and colloidal silica. Sources of the M metals include but are not limited to the halide salts, nitrate salts, acetate salts, and hydroxides of the respective alkali or alkaline earth metals. In particular, M metals may occur as impurities in some organoammonium hydroxide sources as well as in some silica sources. Sources of the E elements include but are not limited to alkali borates, boric acid, precipitated gallium oxyhydroxide, gallium sulfate, alkali gallates, ferric sulfate, ferric chloride, chromium chloride, chromium nitrate, indium chloride and indium nitrate. R is at least one organoammonium cation or a combination of organoammonium cations, as follows. In the case where R is a quaternary ammonium cation or a quaternized alkanolammonium cation, the sources can be the hydroxide, chloride, bromide, iodide and fluoride compounds. Specific examples include without limitation diethyldimethylammonium hydroxide, tetraethylammonium hydroxide, hexamethonium bromide, hexamethonium hydroxide, methyltriethylammonium hydroxide, tetramethylene bis (trimethylammonium) iodide, benzyltrimethylammonium hydroxide and tetrapropylammonium hydroxide. The source of R may also be neutral amines, diamines, and alkanolamines, which are partially converted to organoammonium cations on hydrolysis. Specific examples are triethanolamine, triethylamine, and N,N,N',N' tetramethyl-1,6-hexanediamine.

In a special case, a reagent in the form of an aluminosilicate stock solution may be used. These solutions consist of one or more organoammonium hydroxides and sources of silicon and aluminum that are processed to form a clear homogenous solution. The solution contains aluminosilicate species that typically don't show up in zeolite reaction mixtures derived from separate sources of silicon and aluminum. The reagent is generally alkali-free or contains alkali at impurity levels from the silicon, aluminum, and organoammonium hydroxide sources. One or more of these solutions may be used in a zeolite synthesis. In the case of substitution of Al by E, the corresponding metallosilicate solution may also be employed in a synthesis. Homogenous aluminosilicate solutions are preferred sources of the various components.

The reaction mixture containing reactive sources of the desired components can be described in terms of molar ratios of the oxides by the formula:

$aM_{2/n}O:bR_{2/p}O:(1-c)Al_2O_3:cE_2O_3:dSiO_2:eH_2O$ where "a" has a value of 0 to about 1.25, "b" has a value of about 2 to about 120, "d" has a value of about 8 to about 60, "c" has a value from 0 to about 1.0, and "e" has a value of about 40 to about 9000, while "n" and "p" are as defined above. The reaction mixture is now reacted at reaction conditions including a temperature of about 80° C. to about 200° C. and preferably from about 125° C. to about 175° C. for a period of about 1 day to about 40 days and preferably for a time of about 2 days to about 10 days in a sealed reaction vessel under autogenous pressure. After crystallization is complete, the solid product is isolated from the heterogeneous mixture by means such as filtration or centrifugation, and then washed with de-ionized water and dried in air at ambient temperature up to about 100° C.

The UZM-12 crystalline zeolites are characterized by a three-dimensional framework structure of at least $SiO_2$ and $AlO_2$ tetrahedral units. Depending on parameters such as M/Al ratio, the UZM-12 zeolites obtained can have various crystal size and morphology. Thus at lower M/Al ratios, e.g. 1:1, one obtains crystals with a spheroidal morphology and crystal sizes in the range of about 15 to about 50 nanometers. These zeolites are further characterized by their x-ray diffraction pattern. The x-ray diffraction pattern has at least the diffraction lines with the d-spacings and relative intensities listed in Table A.

TABLE A

| 2Θ | d (Å) | I/Io (%) |
|---|---|---|
| 7.5-7.99 | 11.78-11.06 | m-vs |
| 9.54-10.06 | 9.26-8.79 | w-m |
| 11.5-12.1 | 7.69-7.31 | w-m |
| 13.25-13.79 | 6.68-6.42 | w-vs |
| 15.35-15.95 | 5.77-5.55 | w-m |
| 16.47-16.99 | 5.38-5.21 | w-m |
| 19.33-19.8 | 4.59-4.48 | m-vs |
| 20.45-20.96 | 4.34-4.23 | w-m |
| 21.31-21.83 | 4.17-4.07 | w-m |
| 23.2-23.9 | 3.83-3.72 | m-vs* |
| 23.55-24.25 | 3.77-3.67 | s-vs* |
| 24.55-25.3 | 3.62-3.52 | m-vs |
| 26.85-27.6 | 3.32-3.23 | w-m |
| 28.15-28.85 | 3.17-3.09 | w-m |
| 31.22-31.94 | 2.86-2.8 | m-vs |
| 33.37-34.15 | 2.68-2.62 | w-m |
| 36.05-36.49 | 2.49-2.46 | w-m* |
| 36.36-36.71 | 2.47-2.45 | w-m* |

*Adjacent peaks can coalesce, showing one peak

As-synthesized, the zeolites will contain some of the exchangeable or charge balancing cations in its pores. These exchangeable cations can be exchanged for other cations, or in the case of organic cations, they can be removed by heating under controlled conditions. Ion exchange involves contacting the zeolites with a solution containing the desired cation (at molar excess) at exchange conditions. Exchange conditions include a temperature of about 15° C. to about 100° C. and a time of about 20 minutes to about 50 hours. Calcination conditions include a temperature of about 300° C. to about 600° C. for a time of about 2 to about 24 hours.

A special treatment for removing organic cations which provides the ammonium form of the zeolite is ammonia calcination. Calcination in an ammonia atmosphere can decompose organic cations, presumably to a proton form that can be neutralized by ammonia to form the ammonium cation. The resulting ammonium form of the zeolite can be further ion-exchanged to any other desired form. Ammonia calcination conditions include heating in the ammonia atmosphere at temperatures between about 250° C. and about 600° C. and more preferably between about 250° C. and about 450° C. for times of 10 minutes to 5 hours. Optionally, the treatments can be carried out in multiple steps within this temperature range such that the total time in the ammonia atmosphere does not exceed 5 hours. Above 500° C., the treatments should be brief, less than a half hour and more preferably on the order of 5-10 minutes. Extended calcination times above 500° C. can lead to unintended dealumination along with the desired ammonium ion-exchange and are unnecessarily harsh as most organoammonium templates easily decompose at lower temperatures.

The ion exchanged form of UZM-12 can be described by the empirical formula:

$$M'_{m}{}^{n'+}R_{r}{}^{p+}Al_{(1-x)}E_{x}Si_{y}O_{z'} \quad (2)$$

where R, x, y, and E are as described above and m' has a value from 0 to about 3.5, M' is a cation selected from the group consisting of alkali metals, alkaline earth metals, rare earth metals, (e.g. lanthanum, cerium, etc.) hydrogen ion, ammonium ion, and mixtures thereof, n' is the weighted average valence of M' and varies from about 1 to about 3, r' has a value from 0 to about 3.5, r'+m'>0, and p is the weighted average valence of R and varies from about +1 to +2. The value of z' is given by the formula:

$$z'=(m' \cdot n'+r' \cdot p+3+4 \cdot y)/2.$$

The UZM-12 zeolites represented by equation (2) can be further treated in order to remove aluminum and optionally insert silicon thereby increasing the Si/Al ratio and thus modifying the acidity and ion exchange properties of the zeolites. These treatments include: a) contacting with a fluorosilicate solution or slurry; b) calcining or steaming followed by acid extraction or ion-exchange; c) acid extraction or d) any combination of these treatments in any order.

Fluorosilicate treatment is known in the art and is described in U.S. Pat. No. 6,200,463 B1, which cites U.S. Pat. No. 4,711,770 as describing a process for treating a zeolite with a fluorosilicate salt. Both patents are incorporated by reference in their entirety. General conditions for this treatment are contacting the zeolite with a solution or slurry containing a fluorosilicate salt such as ammonium fluorosilicate (AFS) at a temperature of about 20° C. to about 90° C. The fluorosilicate salt serves two purposes. It removes aluminum atoms from the framework and provides a source of extraneous silicon, which can be inserted into the framework (replacing the aluminum). The fluorosilicate salts which can be used are described by the general formula:

$$A_{2/n}SiF_{6}$$

where n is the valence of A and A is a cation selected from the group consisting of $NH_4^+$, $H^+$, $Mg^{2+}$, $Li^+$, $Na^+$, $Ba^{2+}$, $Cd^{2+}$, $Cu^+$, $Cu^{2+}$, $Ca^{2+}$, $Cs^+$, $Fe^{2+}$, $Ca^{2+}$, $Pb^{2+}$, $Mn^{2+}$, $Rb^+$, $Ag^+$, $Sr^{2+}$, $Tl^+$, and $Zn^{2+}$. The ammonium fluorosilicate is most preferred because of its substantial solubility in water and because it forms water soluble by-product salts upon reaction with the zeolite, namely $(NH_4)_3AlF_6$.

The fluorosilicate salt is contacted with the UZM-12 zeolite in the form of an aqueous solution or slurry at a pH in the range of about 3 to about 7. This solution is contacted with the zeolite either incrementally or continuously at a slow rate such that a sufficient proportion of the framework aluminum atoms removed are replaced by silicon atoms to retain at least 50%, preferably at least 70% of the framework (crystalline) structure of the starting UZM-12 zeolite. The amount of fluorosilicate necessary to carry out the process of this invention can vary considerably, but should be at least in an amount of 0.0075 moles of the fluorosilicate salt per 100 grams of starting zeolite. Once the reaction is complete, the product zeolite UZM-12HS is isolated by conventional techniques such as filtration. UZM-12HS will be used generally to describe UZM-12 zeolites which have undergone one or more treatments whereby aluminum has been removed and optionally silicon has been inserted into the framework.

Without wishing to be bound to any particular theory, the process of removing aluminum and inserting the silicon appears to proceed in two steps in which the aluminum extraction step will, unless controlled, proceed very rapidly while the silicon insertion is relatively slow. If dealumination becomes too extensive without silicon substitution, the crystal structure becomes seriously degraded and ultimately collapses. In general, the rate of aluminum extraction is decreased as the pH of the fluorosilicate solution in contact with the zeolite is increased within the range of about 3 to about 7 and as the concentration of the fluorosilicate in the reaction system is decreased. At pH values below 3, crystal degradation can be unduly severe, whereas at pH values higher than 7, silicon insertion is unduly slow. Also, increasing the reaction temperature tends to increase the rate of substitution of silicon. Increasing the reaction temperature has been found to have less of an effect on dealumination than the pH of the solution. Therefore, the pH may be considered a means of controlling the dealumination while temperature may be considered as a means of controlling the substitution rate.

Theoretically, there is no lower limit for the concentration of fluorosilicate salt in the aqueous solution employed, provided, of course, the pH of the solution is high enough to avoid undue destructive attack on the UZM-12 zeolite structure apart from the intended reaction with the fluorosilicate. A slow rate of addition of fluorosilicate salts insures that adequate time is permitted for the insertion of silicon into the framework before excessive aluminum extraction occurs with consequent collapse of the crystal structure. In general the effective reaction temperature is between about 10° C. and 99° C., preferably between about 20° C. and 95° C., but temperatures of 125° C. or higher and as low as 0° C. can be used.

The maximum concentration of fluorosilicate salt in the aqueous solution employed is, of course, interrelated to the temperature and pH factors and also with the time of contact between the zeolite and the solution and the relative proportions of zeolite and fluorosilicate salt. Solutions having fluorosilicate salt concentrations of between $10^{-3}$ moles per liter of solution and up to saturation of the solution can be employed, but it is preferred that concentrations in the range of between about 0.05 and about 2.0 moles per liter of solution be used. In addition, as hereinbefore discussed, slurries of the fluorosilicate salts may be employed. The aforementioned concentration values are with respect to true solutions, and are not intended to apply to the total fluorosilicate salts in slurries of the salts in water. Even very slightly soluble fluorosilicate salts can be slurried in water and used as a reagent, the undissolved solids being readily available to replace dissolved molecular species consumed in reaction with the zeolite. The minimum value for the amount of fluoro salt to be added is preferably at least equivalent to the minimum mole fraction of aluminum to be removed from the zeolite.

It has been found that when large amounts of silicon atoms are to be substituted, i.e., increasing the $SiO_2/Al_2O_3$ ratio by more than 100%, it is preferable to carry out the process in multiple steps in order to minimize crystal degradation. As the amount of silicon that is substituted into the framework is substantially increased (beyond 100% increase) it may actually be necessary to carry out the process in two or more steps in order to prevent excessive degradation of the crystalline structure. That is, contacting with the fluorosilicate salt is carried out in two or more steps using a lower concentration of the fluorosilicate salt than required to replace the desired amount of silicon in one step. After each fluorosilicate treatment, the product is washed to remove fluoride and aluminum. Drying of the zeolite at 50° C. between treatments may also be done to facilitate the handling of the wet zeolite product.

Another embodiment of the invention involves contacting the UZM-12 starting zeolite with an acid (acid extraction) in order to remove some of the aluminum from the framework and thereby provide the UZM-12HS zeolite of the invention. Although it is known that aluminum can be extracted from the framework by acids, it is not predictable whether the resulting product will retain a substantial portion of its crystallinity or whether the structure will collapse resulting in an amorphous material.

The acids which can be used in carrying out acid extraction include without limitation mineral acids, carboxylic acids and mixtures thereof. Examples of these include sulfuric acid, nitric acid, ethylenediaminetetraacetic acid (EDTA), citric acid, oxalic acid, etc. The concentration of acid which can be used is not critical but is conveniently between about 1 wt. % to about 80 wt. % acid and preferably between 5 wt. % and 40 wt. % acid. Acid extraction conditions include a temperature of about 10° C. to about 100° C. for a time of about 10 minutes to about 24 hours. Once treated with the acid, the treated UZM-12 zeolite is isolated by means such as filtration, washed with deionized water and dried at ambient temperature up to about 100° C.

The extent of dealumination obtained from acid extraction depends on the cation form of the starting UZM-12 as well as the acid concentration and the time and temperature over which the extraction is conducted. For example, if organic cations are present in the starting UZM-12, the extent of dealumination will be slight compared to a UZM-12 in which the organic cations have been removed. This may be preferred if it is desired to have dealumination just at the surface of the UZM-12. As stated above, convenient ways of removing the organic cations include calcination, ammonia calcination, steaming and ion exchange. Calcination, ammonia calcination and ion exchange conditions are as set forth above. Steaming conditions include a temperature of about 400° C. to about 850° C. with from about 1% to about 100% steam for a time of about 10 minutes to about 48 hours and preferably a temperature of about 500° C. to about 600° C., steam concentration of about 5 to about 50% and a time of about 1 to about 2 hours.

It should be pointed out that both calcination and steaming treatments not only remove organic cations, but can also dealuminate the zeolite. Thus, alternate embodiments for dealumination include: a calcination treatment followed by acid extraction and steaming followed by acid extraction. A further embodiment for dealumination comprises calcining or steaming the starting UZM-12 zeolite followed by an ion-exchange treatment. Of course an acid extraction can be carried out concurrently with, before or after the ion exchange.

The ion exchange conditions are the same as set forth above, namely a temperature of about 15° C. to about 100° C. and a time of about 20 minutes to about 50 hours. Ion exchange can be carried out with a solution comprising a cation (M1') selected from the group consisting of alkali metals, alkaline earth metals, rare earth metals, hydrogen ion, ammonium ion, and mixtures thereof. By carrying out this ion exchange, the M1 cation is exchanged for a secondary or different M1' cation. In a preferred embodiment, the UZM-12HS composition after the steaming or calcining step is contacted with an ion exchange solution comprising an ammonium salt. Examples of ammonium salts include but are not limited to ammonium nitrate, ammonium chloride, ammonium bromide, and ammonium acetate. The ammonium ion containing solution can optionally contain a mineral acid such as but not limited to nitric, hydrochloric, sulfuric and mixtures thereof. The concentration of the mineral acid is that amount necessary to give a ratio of $H^+$ to $NH_4^+$ of 0 to 1. This ammonium ion exchange aids in removing any debris present in the pores after the steaming and/or calcination treatments.

It is apparent from the foregoing that, with respect to effective process conditions, it is desirable that the integrity of the zeolite crystal structure be substantially maintained throughout the dealumination process, and that the zeolite retains at least 50%, preferably at least 70% and more preferably at least 90% of its original crystallinity. A convenient technique for assessing the crystallinity of the products relative to the crystallinity of the starting material is the comparison of the relative intensities of the d-spacing of their respective X-ray powder diffraction patterns. The sum of the peak intensities, in arbitrary units above the background, of the starting material is used as the standard and is compared with the corresponding peak intensities of the products. When, for example, the numerical sum of the peak heights of the molecular sieve product is 85 percent of the value of the sum of the peak intensities of the starting zeolite, then 85 percent of the crystallinity has been retained. In practice it is common to utilize only a portion of the peaks for this purpose, as for example, five or six of the strongest peaks. Other indications of the retention of crystallinity are surface area and adsorption capacity. These tests may be preferred when the substituted metal significantly changes, e.g., increases, the absorption of x-rays by the sample or when peaks experience substantial shifts such as in the dealumination process.

After having undergone any of the dealumination treatments as described above, the UZM-12HS is usually dried and can be used in various processes as discussed below. Applicants have found the properties of the UZM-12HS can be further modified by one or more additional treatment. These treatments include steaming, calcining or ion exchanging and can be carried out individually or in any combination. Some of these combinations include but are not limited to:

steam ⟶ calcine ⟶ ion exchange;

calcine ⟶ steam ⟶ ion exchange;

ion exchange ⟶ calcine ⟶ steam ion exchange ⟶ steam ⟶ calcine;

steam ⟶ calcine;

The dealumination treatment described above can be combined in any order to provide the zeolites of the invention although not necessarily with equivalent result. It should be pointed out that the particular sequence of treatments, e.g., AFS, acid extraction, steaming, calcining, etc can be repeated as many times as necessary to obtain the desired properties. Of course one treatment can be repeated while not repeating other treatments, e.g., repeating the AFS two or more times before carrying out steaming or calcining;

etc. Finally, the sequence and/or repetition of treatments will determine the properties of the final UZM-12HS composition.

The UZM-12HS as prepared above is described by the empirical formula on an anhydrous basis of

 (3)

where M1 is at least one exchangeable cation selected from the group consisting of alkali, alkaline earth metals, rare earth metals, ammonium ion, hydrogen ion and mixtures thereof, a is the mole ratio of M1 to (Al+E) and varies from about 0.01 to about 50, n is the weighted average valence of M1 and has a value of about +1 to about +3, E is an element selected from the group consisting of gallium, iron, boron, chromium, indium and mixtures thereof, x is the mole fraction of E and varies from 0 to 1.0, y' is the mole ratio of Si to (Al+E) and varies from greater than about 5.75 to virtually (pure silica) and z" is the mole ratio of O to (Al+E) and has a value determined by the equation:

$$z''=(a \cdot n+3+4 \cdot y')/2.$$

By virtually pure silica is meant that virtually all the aluminum and/or the E metals have been removed from the framework. It is well know that it is virtually impossible to remove all the aluminum and/or E metal. Numerically, a zeolite is virtually pure silica when y' has a value of at least 3,000, preferably 10,000 and most preferably 20,000. Thus, ranges for y' are from 5.75 to 3,000 preferably greater than 10 to about 3,000; 5.75 to 10,000 preferably greater than 10 to about 10,000 and 5.75 to 20,000 preferably greater than 10 to about 20,000.

In specifying the proportions of the zeolite starting material or adsorption properties of the zeolite product and the like herein, the "anhydrous state" of the zeolite will be intended unless otherwise stated. The term "anhydrous state" is employed herein to refer to a zeolite substantially devoid of both physically adsorbed and chemically adsorbed water.

The zeolites of this invention (both UZM-12 and UZM-12HS) are capable of separating mixtures of molecular species based on the molecular size (kinetic diameter) or on the degree of polarity of the molecular species. When the separation of molecular species is based on molecular size, separation is accomplished by the smaller molecular species entering the intracrystalline void space while excluding larger species. The kinetic diameters of various molecules such as oxygen, nitrogen, carbon dioxide, carbon monoxide are provided in D. W. Breck, Zeolite Molecular Sieves, John Wiley and Sons (1974) p. 636. UZM-12 may be applied in propane-propylene separation.

The crystalline microporous compositions of the present invention (both UZM-12 and UZM-12HS) either as-synthesized, after calcination or after any of the above referenced treatments can be used as catalysts or catalyst supports in hydrocarbon conversion processes. Hydrocarbon conversion processes are well known in the art and include ring-opening, cracking, hydrocracking, alkylation of both aromatics and isoparaffins, isomerization, polymerization, reforming, dewaxing, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are set forth in U.S. Pat. No. 4,310,440 and U.S. Pat. No. 4,440,871 which are incorporated by reference.

Ring opening processes involves opening or clearing cyclic paraffins to acyclic paraffins. The feeds which can be used in the ring opening process are any of those which comprises $C_5$-$C_6$ aliphatic rings, i.e. naphthenic rings. Naphtha feeds can vary considerably in the amount of aromatic, naphthene and paraffin components which they complain. The feedstream is contacted with the catalyst at ring opening conditions which include a temperature of about 200° C. to about 600° C., a pressure of about atmospheric to about 20,684 kPag, (3000 psig) and preferably from about 1379 kPag (200 psig) to about 13790 kPa (2000 psig), a liquid hourly space velocity of about 0.1 to about 30 $hr^{-1}$ and preferably about 2 to about 10 $hr^{-1}$ and $H_2$/HC (hydrocarbon) ratio from about 0.1 to about 30 and preferably from about 1 to about 10.

Hydrocracking conditions typically include a temperature in the range of 400° to 1200° F. (204-649° C.), preferably between 600° and 950° F. (316-510° C.). Reaction pressures are in the range of atmospheric to about 3,500 psig (24,132 kPa g), preferably between 200 and 3000 psig (1379-20,685 kPa g). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178-8,888 std. $m^3/m^3$), preferably between 2,000 and 30,000 scf per barrel of charge (355-5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the UZM-12 composition using feedstocks such as gas oils, heavy naphthas, deasphalted crude oil residua, etc. with gasoline being the principal desired product. Temperature conditions of 850° to 1100° F., LHSV values of 0.5 to 10 $hr^{-1}$ and pressure conditions of from about 0 to 50 psig are suitable.

Alkylation of aromatics usually involves reacting an aromatic, especially benzene, with a monoolefin ($C_2$ to $C_{12}$) to produce a linear alkyl substituted aromatic. The process is carried out at an aromatic:olefin (e.g., benzene:olefin) ratio of between 5:1 and 30:1, a LHSV of about 0.3 to about 6 $hr^{-1}$, a temperature of about 100° to about 250° C. and pressures of about 200 to about 1000 psig. Further details on apparatus may be found in U.S. Pat. No. 4,870,222 which is incorporated by reference.

Alkylation of isoparaffins with olefins to produce alkylates suitable as motor fuel components is carried out at temperatures of −30' to 40° C., pressures from about atmospheric to about 6,894 kPa (1,000 psig) and a weight hourly space velocity (WHSV) of 0.1 to about 120 $hr^{-1}$. Details on paraffin alkylation may be found in U.S. Pat. No. 5,157,196 and U.S. Pat. No. 5,157,197, which are incorporated by reference.

Other reactions may be catalyzed by these crystalline microporous compositions, including base-catalyzed side chain alkylation of alkylaromatics, aldol-condensations, olefin double bond isomerization and isomerization of acetylenes, alcohol dehydrogenation, and olefin dimerization, oligomerization and conversion of alcohol to olefins. Suitably ion exchanged forms of these materials can catalyze the reduction of $NO_x$ to $N_2$ in automotive and industrial exhaust streams. Some of the reaction conditions and types of feeds that can be used in these processes are set forth in U.S. Pat. No. 5,015,796 and in H. Pines, THE CHEMISTRY OF CATALYTIC HYDROCARBON CONVERSIONS, Academic Press (1981) pp. 123-154 and references contained therein, which are incorporated by reference.

The X-ray patterns presented in the following examples (and tables above) were obtained using standard X-ray powder diffraction techniques. The radiation source was a high-intensity X-ray tube operated at 45 kV and 35 ma. The diffraction pattern from the copper K-alpha radiation was obtained by appropriate computer based techniques. Flat compressed powder samples were continuously scanned at 2° (2θ) per minute from 2° to 70°(2θ). Interplanar spacings (d) in Angstrom units were obtained from the position of the diffraction peaks expressed as 2θ where θ is the Bragg angle as observed from digitized data. Intensities were determined from the integrated area of diffraction peaks after subtracting background, "$I_o$" being the intensity of the strongest line or peak, and "I" being the intensity of each of the other peaks.

As will be understood by those skilled in the art, the determination of the parameter 2θ is subject to both human and mechanical error, which in combination can impose an uncertainty of about ±0.4 on each reported value of 2θ and up to ±0.5 on reported values for nanocrystalline materials. This uncertainty is, of course, also manifested in the reported values of the d-spacings, which are calculated from the θ values. This imprecision is general throughout the art and is not sufficient to preclude the differentiation of the present crystalline materials from each other and from the compositions of the prior art. In some of the X-ray patterns reported, the relative intensities of the d-spacings are indicated by the notations vs, s, m and w which represent very strong, strong, medium, and weak, respectively. In terms of 100 X $I/I_o$, the above designations are defined as w=0-15; m=15-60; s=60-80 and vs=80-100. In certain instances the purity of a synthesized product may be assessed with reference to its X-ray powder diffraction pattern. Thus, for example, if a sample is stated to be pure, it is intended only that the X-ray pattern of the sample is free of lines attributable to crystalline impurities, not that there are no amorphous materials present.

In order to more fully illustrate the invention, the following examples are set forth. It is to be understood that the examples are only by way of illustration and are not intended as an undue limitation on the broad scope of the invention as set forth in the appended claims.

EXAMPLE 1

An aluminosilicate solution was prepared by first mixing 123.0 g of aluminum sec-butoxide (95+%) and 1344.6 g of a tetraethylammonium hydroxide solution (TEAOH, 35%) and 797.0 g de-ionized water. To this solution 1200.0 g of colloidal silica, (Ludox™ AS-40, 40% $SiO_2$) was added. The reaction mixture was homogenized for 1 hour, and aged for 3 days at 95° C. Analysis of the mixture indicated that it contained 6.89% Si by weight.

A 142.86 g portion of this aluminosilicate solution was combined with 54.18 g TEAOH (35%). A solution containing 58.30 g hexamethonium bromide in 100.0 g de-ionized water was added slowly to the aluminosilicate mixture and then homogenized for an hour. This mixture was divided into 3 equal portions and to one portion there was added dropwise a solution of 1.00 g potassium chloride dissolved in 5.2 g de-ionized water, homogenized for one hour and distributed among 6 Teflon™ lined autoclaves. One autoclave was reacted at 125° C. for 7 days at which point the solid product was isolated, washed with water and dried at 95° C. Elemental analysis showed that this product contained: Si/Al=5.94, K/Al=0.41, N/Al=0.81, and C/N=6.11. Powder X-ray diffraction analysis showed this material to be UZM-12 with characteristic lines presented in Table 1. Scanning Electron Microscopy (SEM) showed the material to be submicron spheres of 0.2-0.6μ diameter. A portion of the product was calcined under a flow of air for 8 hours at 520° C. Nitrogen adsorption showed the BET surface area was 486 $m^2/g$ and the micropore volume was 0.25 cc/g.

TABLE 1

| 2-Θ | d (Å) | I/Io (%) |
|---|---|---|
| 7.78 | 11.36 | vs |
| 9.74 | 9.07 | m |
| 11.68 | 7.57 | m |
| 13.50 | 6.55 | m |
| 14.06 | 6.29 | w |
| 15.61 | 5.67 | m |
| 16.68 | 5.31 | m |
| 17.90 | 4.95 | w |
| 19.22 | 4.61 | w |
| 19.54 | 4.54 | s |
| 20.70 | 4.29 | m |
| 21.52 | 4.13 | m |
| 23.50 | 3.78 | vs |
| 23.82 | 3.73 | s |
| 24.80 | 3.59 | vs |
| 27.20 | 3.28 | m |
| 28.34 | 3.15 | m |
| 30.76 | 2.90 | w |
| 31.50 | 2.84 | vs |
| 32.10 | 2.79 | m |
| 33.72 | 2.66 | w |
| 35.56 | 2.52 | w |
| 36.26 | 2.48 | m |
| 36.48 | 2.46 | m |
| 39.68 | 2.27 | w |
| 40.09 | 2.25 | w |
| 40.54 | 2.22 | w |
| 41.32 | 2.18 | w |
| 43.08 | 2.10 | w |
| 43.84 | 2.06 | w |
| 46.10 | 1.97 | w |
| 46.64 | 1.95 | w |
| 48.06 | 1.89 | m |
| 48.78 | 1.87 | w |
| 49.14 | 1.85 | w |

EXAMPLE 2

An aluminosilicate solution was prepared as in Example 1. Elemental analysis indicated a content of 6.71% Si by weight.

A 145.78 g portion of this reaction mixture was combined with 53.53 g TEAOH (35%) followed by the addition of 47.15 g of a solution of tetramethylene bis(trimethylammonium) diiodide*40 $H_2O$. To this there were added dropwise 6.60 g of a solution of KCl*13.78 $H_2O$. After homogenization, the reaction mixture was distributed among 4 Teflon™ lined autoclaves. One autoclave was heated to 125° C. and the mixture reacted under autogenous pressure for 5 days. The solid product was recovered by washed with de-ionized water and dried at 95° C. Elemental analysis gave a composition of Si/Al=6.32; K/Al=0.38; N/Al=0.98 and C/N=5.0. X-ray diffraction analysis identified the material as UZM-12 and characteristic diffraction lines are given in Table 2. The x-ray diffraction lines were extremely broad, indicative of very small crystallites. This was supported by the fact that the crystallites were significantly smaller than 100 nm, too small to be visible by routine SEM. The drawing shows the x-ray diffraction patterns of this UZM-12 compared to the large crystal sample of UZM-12 from example 14. The peaks are so broadened by the small crystallite size that sometimes two peaks coalesce into one broad peak.

TABLE 2

| 2-Θ | d (Å) | I % |
|---|---|---|
| 7.84 | 11.26 | vs |
| 9.94 | 8.89 | w |
| 11.86 | 7.46 | w |
| 13.64 | 6.49 | m |
| 14.24 | 6.21 | w |
| 15.72 | 5.63 | m |
| 16.78 | 5.28 | w |
| 19.58 | 4.53 | s |
| 20.80 | 4.27 | w |
| 21.72 | 4.09 | m |
| 23.88 | 3.72 | vs |
| 25.16 | 3.54 | s |
| 27.42 | 3.25 | w |
| 28.74 | 3.10 | w |
| 31.80 | 2.81 | s |
| 34.02 | 2.63 | w |
| 36.58 | 2.45 | m |

EXAMPLE 3

An aluminosilicate solution was prepared by first mixing 59.12 g of aluminum sec-butoxide (95+%), 448.56 g of diethyldimethyl ammonium hydroxide (DEDMAOH 20%) and 672.84 g of water, followed by the addition of 400.0 g TEOS (98%) and mixed for 2 hours. The alcohol in the mixture was removed using a rotary evaporator. Elemental analysis showed a silicon content of 5.87 wt. %.

A 150.0 g portion of this aluminosilicate solution was combined (dropwise with a solution containing 14.09 g hexamethonium bromide in 26.5 g de-ionized water. A KOH solution (2.18 g KOH pellets dissolved in 6.0 g de-ionized water) was then added dropwise with stirring. The reaction mixture was distributed among several Teflon lined autoclaves. Autoclaves where heated to 100° C. or 125° C. and the mixtures reacted for 7 and 5 days respectively. The solid products were recovered by centrifugation, washed with de-ionized water and dried at 95° C.

X-ray diffraction analysis showed both products to be UZM-12. Characteristic lines of the UZM-12 isolated from the 5 day 125° C. preparation are given in Table 3. This product had a composition of: Si/Al=5.83, K/Al=0.34, N/Al=0.91, and C/N=5.54. Scanning Electron Microscope (SEM) images showed the material to be submicron flat discs of 300-500 nm in diameter. A portion of the product was calcined under a flow of air for 6 hours at 550° C. Nitrogen adsorption showed the BET surface area to be 554 m²/g while the micropore volume was 0.24 cc/g.

TABLE 3

| 2-Theta | d (Å) | I/Io (%) |
|---|---|---|
| 7.80 | 11.33 | s |
| 9.90 | 8.93 | m |
| 11.62 | 7.61 | w |
| 13.52 | 6.54 | m |
| 15.60 | 5.68 | w |
| 16.78 | 5.28 | w |
| 17.91 | 4.95 | w |
| 19.50 | 4.55 | m |
| 20.64 | 4.30 | m |
| 21.50 | 4.13 | m |
| 23.46 | 3.79 | vs |
| 23.80 | 3.74 | vs |
| 24.84 | 3.58 | m |
| 27.16 | 3.28 | m |
| 28.30 | 3.15 | m |
| 30.66 | 2.91 | w |
| 31.48 | 2.84 | m |
| 32.02 | 2.79 | w |
| 33.72 | 2.66 | w |
| 36.16 | 2.48 | m |
| 41.17 | 2.19 | w |
| 43.08 | 2.10 | w |
| 43.84 | 2.06 | w |
| 46.08 | 1.97 | w |
| 48.18 | 1.89 | w |
| 50.14 | 1.82 | w |

EXAMPLE 4

An aluminosilicate solution was prepared by first mixing 61.17 g of aluminum sec-butoxide (95+%) and 473.64 g DEDMAOH (20%). To this mixture 300.0 g of colloidal silica, (Ludox™ AS-40, 40% $SiO_2$) was added. The reaction mixture was homogenized for 1 hour and then aged in a Teflon bottle for 24 hours at 95° C. Elemental analysis of the resulting solution indicated a content of 7.14 wt % Si.

To a 150.0 g portion of this aluminosilicate solution there were added 41.92 g of benzyltrimethyl ammonium hydroxide (BzTMAOH 19%). A KCl solution (1.74 g potassium chloride dissolved in 7.0 g de-ionized water) was then added dropwise. The homogenized reaction mixture was distributed among 6 Teflon lined autoclaves. Samples that were reacted at 100° C. for 21 days, 125° C. for 21 days and 125° C. for 28 days resulted in products identified as UZM-12.

Characteristic diffraction lines for the 125° C.-28 day material are given in Table 4. This product had a composition of: Si/Al=6.11, K/Al=0.45, N/Al=1.07, and C/N=6.58.

TABLE 4

| 2-Θ | d (Å) | I/Io (%) |
|---|---|---|
| 7.68 | 11.50 | Vs |
| 9.66 | 9.15 | W |
| 11.88 | 7.45 | W |
| 13.44 | 6.58 | M |
| 15.48 | 5.72 | M |
| 16.59 | 5.34 | W |
| 17.86 | 4.96 | W |
| 19.42 | 4.57 | M |
| 20.58 | 4.31 | M |
| 21.59 | 4.11 | W |
| 23.34 | 3.81 | Vs |
| 23.80 | 3.74 | Vs |
| 24.64 | 3.61 | M |
| 24.92 | 3.57 | M |
| 27.10 | 3.29 | M |
| 28.26 | 3.15 | M |
| 30.63 | 2.92 | W |
| 31.42 | 2.84 | S |
| 31.94 | 2.80 | M |

TABLE 4-continued

| 2-Θ | d (Å) | I/Io (%) |
|---|---|---|
| 33.56 | 2.67 | W |
| 36.14 | 2.48 | M |
| 42.92 | 2.11 | W |
| 48.36 | 1.88 | W |
| 50.00 | 1.82 | W |
| 51.70 | 1.77 | W |
| 55.82 | 1.65 | M |

EXAMPLE 5

An aluminosilicate reaction mixture was prepared by first mixing 48.93 g of aluminum sec-butoxide (95+%) and 404.0 g of tetrapropylammonium hydroxide (TPAOH 40%). To this mixture 300.0 g of colloidal silica, (Ludox AS-40, 40% $SiO_2$) was added, homogenized for 1 hour, and then aged in a 1 liter Teflon bottle for 24 hours at 95° C. Elemental analysis showed that the solution contained 7.55 wt % Si.

To a 146.40 g portion of this reaction mixture there were added 14.94 g hexamethonium bromide dissolved in 23.0 g de-ionized water. A KOH solution (2.31 g KOH (88%) pellets dissolved in 6.0 g de-ionized water) was then added dropwise, homogenized for one hour and then distributed among 6 Teflon lined autoclaves and the mixtures reacted at 100° for 6 days, 125° C. for 3, 5, and 7 days, 150° C. for 2 and 5 days at autogenous pressures. The solid products were recovered by centrifugation, washed with de-ionized water and dried at 95° C.

The products from all reactions resulted in UZM-12 as determined by powder x-ray diffraction. Characteristic diffraction lines for the 5-day preparations at 125° C. and 150° C. are shown in Table 5. Elemental analyses on these materials showed the composition of the 5 day-125° C. product to consist of: Si/Al=6.28, K/Al=0.41, N/Al=0.87, and C/N=6.11; while the 5 day-150° C. product yielded the elemental mole ratios Si/Al=6.84, K/Al=0.40, N/Al=0.98, and C/N=5.84. Scanning Electron Microscopy (SEM) images showed the 150° C. material to be significantly smaller than 100 nm, too small to determine morphology. A Transmission Electron Microscopy (TEM) study showed the crystallites to fall in a size range from about 20 nm to 50 nm. A portion of this latter product was calcined under a flow of air for 6 hours at 550° C. Nitrogen adsorption showed the BET surface area was 472 m²/g and the micropore volume was 0.19 cc/g.

TABLE 5

| 125° C.-5 d | | | 150° C.-5 d | | |
|---|---|---|---|---|---|
| 2-Θ | d (Å) | I/Io (%) | 2-Θ | d (Å) | I/Io (%) |
| 7.78 | 11.35 | m | 7.84 | 11.27 | s |
| 9.76 | 9.06 | w | 9.78 | 9.03 | m |
| 11.68 | 7.57 | w | 11.66 | 7.58 | w |
| 13.50 | 6.55 | m | 13.58 | 6.52 | m |
| 14.10 | 6.28 | w | 14.07 | 6.29 | w |
| 15.62 | 5.67 | m | 15.68 | 5.65 | m |
| 16.70 | 5.31 | w | 16.78 | 5.28 | w |
| 17.91 | 4.95 | w | 17.96 | 4.94 | w |
| 19.56 | 4.54 | m | 19.26 | 4.60 | m |
| 20.78 | 4.27 | m | 19.62 | 4.52 | m |
| 21.60 | 4.11 | m | 20.80 | 4.27 | m |
| 23.60 | 3.77 | vs | 21.58 | 4.11 | m |
| 23.84 | 3.73 | vs | 23.60 | 3.77 | s |
| 24.80 | 3.59 | m | 23.90 | 3.72 | vs |
| 27.24 | 3.27 | m | 24.78 | 3.59 | m |
| 28.38 | 3.14 | m | 27.28 | 3.27 | m |
| 30.68 | 2.91 | w | 28.40 | 3.14 | m |
| 31.58 | 2.83 | s | 31.64 | 2.83 | s |
| 32.12 | 2.78 | m | 32.18 | 2.78 | m |
| 33.78 | 2.65 | w | 33.80 | 2.65 | w |
| 36.30 | 2.47 | w | 36.44 | 2.46 | m |
| 39.70 | 2.27 | w | 41.47 | 2.18 | w |
| 41.43 | 2.18 | w | 43.20 | 2.09 | w |
| 43.14 | 2.10 | w | 46.24 | 1.96 | w |
| 43.94 | 2.06 | w | 48.00 | 1.89 | w |
| 46.22 | 1.96 | w | 50.38 | 1.81 | w |
| 48.12 | 1.89 | w | 51.74 | 1.77 | w |
| 50.26 | 1.81 | w | | | |
| 51.76 | 1.76 | w | | | |

EXAMPLE 6

An aluminosilicate solution was prepared by first mixing 48.93 g of aluminum sec-butoxide (95+%) and 404.0 g TPAOH (40%) followed by the addition of 300.0 g of colloidal silica, (Ludox AS-40, 40% $SiO_2$). The reaction mixture was homogenized for 1 hour, and then aged in a 1 liter Teflon bottle for 20 hours at 95° C. Elemental analysis indicated a Si content of 7.58 wt %.

To a 100.00 g portion of this aluminosilicate solution there were added 17.16 g TPAOH (40%), followed by the addition of a solution consisting of 11.89 g of tetramethylene bis(trimethylammonium) diiodide dissolved in 13.0 g de-ionized water. A KCl solution (1.04 g potassium chloride dissolved in 4.4 g de-ionized water) was then added dropwise and stirred for an hour. The homogenized reaction mixture was distributed among 5 Teflon lined autoclaves and digested at 125° C. for 4 and 7 days, 150° C. for 2 days, and 175° C. for 2 days, all at autogenous pressure. The solid products were recovered by centrifugation, washed with de-ionized water and dried at 95° C.

Powder x-ray diffraction analysis showed that the products from all reactions were UZM-12. Characteristic diffraction lines for the 4 day-125° C., 2 day-150° C., and 2 day-175° C. samples are shown in Table 6. Physical characteristics for these products are shown in Table 7. Scanning Electron Microscopy (SEM) of the 150 and 175° C. materials showed the crystallite size to be significantly smaller than 100 nm. A TEM study of the 150° C. material showed that the crystallites were about 15-50 nm in diameter.

TABLE 6

| 125° C.-4 day | | | 150° C.-2 day | | | 175° C.-2 day | | |
|---|---|---|---|---|---|---|---|---|
| 2-Θ | d (Å) | I/Io (%) | 2-Θ | d (Å) | I/Io (%) | 2-Θ | d (Å) | I/Io (%) |
| 7.62 | 11.59 | vs | 7.82 | 11.30 | vs | 7.88 | 11.21 | Vs |
| 9.74 | 9.07 | w | 9.84 | 8.98 | m | 9.82 | 9.00 | M |
| 11.74 | 7.53 | w | 11.85 | 7.46 | w | 11.97 | 7.39 | M |
| 13.58 | 6.52 | m | 13.60 | 6.51 | m | 13.66 | 6.48 | M |
| 14.18 | 6.24 | w | 14.17 | 6.24 | w | 15.82 | 5.60 | M |
| 15.64 | 5.66 | m | 15.70 | 5.64 | m | 16.80 | 5.27 | M |
| 16.74 | 5.29 | m | 16.74 | 5.29 | m | 19.68 | 4.51 | M |
| 19.52 | 4.54 | s | 17.92 | 4.95 | w | 20.80 | 4.27 | M |
| 20.62 | 4.30 | w | 19.62 | 4.52 | s | 21.72 | 4.09 | M |
| 21.60 | 4.11 | m | 20.82 | 4.26 | m | 23.72 | 3.75 | Vs |
| 23.82 | 3.73 | s | 21.66 | 4.10 | m | 24.08 | 3.69 | S |
| 25.04 | 3.55 | s | 23.64 | 3.76 | vs | 25.16 | 3.54 | M |

TABLE 6-continued

| 125° C.-4 day | | | 150° C.-2 day | | | 175° C.-2 day | | |
|---|---|---|---|---|---|---|---|---|
| 2-Θ | d (Å) | I/Io (%) | 2-Θ | d (Å) | I/Io (%) | 2-Θ | d (Å) | I/Io (%) |
| 27.44 | 3.25 | m | 25.00 | 3.56 | m | 27.44 | 3.25 | M |
| 28.60 | 3.12 | m | 27.36 | 3.26 | m | 28.49 | 3.13 | W |
| 30.88 | 2.89 | w | 28.56 | 3.12 | m | 30.96 | 2.89 | W |
| 31.68 | 2.82 | s | 30.82 | 2.90 | w | 31.74 | 2.82 | M |
| 33.84 | 2.65 | w | 31.68 | 2.82 | s | 32.32 | 2.77 | M |
| 36.38 | 2.47 | m | 32.28 | 2.77 | m | 33.86 | 2.64 | W |
| 43.00 | 2.10 | w | 33.84 | 2.65 | w | 36.62 | 2.45 | M |
| 48.60 | 1.87 | w | 36.36 | 2.47 | m | 39.81 | 2.26 | W |
| 52.19 | 1.75 | w | 41.58 | 2.17 | w | 41.59 | 2.17 | W |
| | | | 43.18 | 2.09 | w | 48.36 | 1.88 | W |
| | | | 48.67 | 1.87 | w | 50.50 | 1.81 | W |
| | | | 52.02 | 1.76 | w | 52.02 | 1.76 | W |

TABLE 7

| Sample | 125° C.-4 day | 150° C.-2 day | 175° C.-2 day |
|---|---|---|---|
| Si/Al | 6.42 | 7.39 | 7.71 |
| K/Al | 0.40 | 0.39 | 0.36 |
| N/Al | 1.03 | 1.06 | 1.14 |
| C/N | 4.96 | 4.92 | 5.33 |
| Surface Area (BET) | — | 490 m$^2$/g | 431 m$^2$/g |
| Micropore volume | — | 0.17 cc/g | 0.14 cc/g |

EXAMPLE 7

An aluminosilicate reaction mixture was prepared by first mixing 16.40 g of aluminum sec-butoxide (95+%) and 139.2 g BzTMAOH (40%, 0.77% K impurity), followed by the addition of 100.0 g of colloidal silica, (Ludox AS-40, 40% SiO$_2$). The reaction mixture was homogenized for 1 hour and a solution of 28.48 g tetramethylene bis(trimethylammonium) diiodide dissolved in 50.0 g de-ionized water was added slowly. After mixing, a portion of the reaction mixture was placed in a Teflon lined autoclave and reacted at 125° C. for 7 days under autogenous pressure. The solid product was recovered by centrifugation, washed with de-ionized water and dried at 95° C.

The product was identified as UZM-12 via powder x-ray diffraction. Characteristic diffraction lines for this product are listed in Table 8. The composition of this product consisted of the following elemental mole ratios: Si/Al=6.43, K/Al=0.31, N/Al=1.18, and C/N=5.52.

TABLE 8

| 2-Θ | d (Å) | I/Io (%) |
|---|---|---|
| 7.74 | 11.41 | s |
| 9.94 | 8.89 | w |
| 11.94 | 7.41 | w |
| 13.66 | 6.48 | w |
| 15.70 | 5.64 | w |
| 16.88 | 5.25 | w |
| 19.46 | 4.56 | vs |
| 20.84 | 4.26 | w |
| 21.58 | 4.11 | w |
| 23.76 | 3.74 | s |
| 25.06 | 3.55 | vs |
| 27.34 | 3.26 | w |
| 28.40 | 3.14 | w |
| 31.62 | 2.83 | m |
| 36.51 | 2.46 | w |

EXAMPLE 8

An aluminosilicate solution was prepared by first mixing 20.50 g of aluminum sec-butoxide and 187.17 g of hexamethonium hydroxide (HM(OH)$_2$ 21%), followed by the addition of 100.0 g of colloidal silica, (Ludox AS-40, 40% SiO$_2$). The reaction mixture was homogenized for 1 hour and then aged overnight at 95° C. Elemental analysis showed that the solution contained 6.66 wt. % Si.

To a 176.0 g portion of this aluminosilicate solution there was added (dropwise) a KCl solution (1.95 g KCl dissolved in 6.0 g de-ionized water). Samples of the resultant reaction mixture were placed in Teflon lined autoclaves and reacted at 150° C. for 7 and 10 days and 175° C. for 1, 2 and 5 days. The solid products were recovered by centrifugation, washed with de-ionized water and dried at 95° C.

The products were identified as pure UZM-12 by powder x-ray diffraction. Characteristic diffraction lines for the 175° C.-5 day material are listed in Table 9. Elemental analysis of the 175° C.-5 day product gave mole ratios of: Si/Al=6.81, K/Al=0.32, N/Al=0.96, and C/N=5.63.

TABLE 9

| 2-Θ | d (Å) | I/Io (%) |
|---|---|---|
| 7.72 | 11.44 | s |
| 9.68 | 9.13 | m |
| 11.64 | 7.60 | w |
| 13.48 | 6.56 | m |
| 13.91 | 6.36 | w |
| 15.58 | 5.68 | m |
| 16.62 | 5.33 | m |
| 17.90 | 4.95 | w |
| 19.44 | 4.56 | m |
| 20.68 | 4.29 | m |
| 21.50 | 4.13 | m |
| 23.52 | 3.78 | vs |
| 24.70 | 3.60 | m |
| 27.16 | 3.28 | m |
| 28.34 | 3.15 | m |
| 31.42 | 2.84 | s |
| 32.12 | 2.78 | m |
| 33.59 | 2.67 | w |
| 36.36 | 2.47 | m |
| 41.35 | 2.18 | w |
| 43.01 | 2.10 | w |
| 45.99 | 1.97 | w |
| 47.86 | 1.90 | w |
| 50.17 | 1.82 | w |
| 51.60 | 1.77 | w |

EXAMPLE 9

An aluminosilicate solution was prepared by mixing 48.93 g of aluminum sec-butoxide (95+%) and 404.0 g TPAOH (40%) followed by the addition of 300.0 g of colloidal silica (Ludox AS-40, 40% SiO$_2$). The reaction mixture was homogenized for 1 hour and then aged in a 1 liter Teflon bottle for 20 hours at 95° C. Elemental analysis of the resulting solution gave a Si content of 7.78 wt %.

To a 150.0 g portion of this solution there was added a solution containing 14.70 g hexamethonium bromide dissolved in 26.0 g de-ionized water. A KOH solution (2.27 g KOH (88%) dissolved in 5.2 g de-ionized water) was then added dropwise. Samples of the reaction mixture were placed in Teflon lined autoclaves and reacted at 175° C. for 1 and 2 days. at autogenous pressures. The solid products were recovered by centrifugation, washed with de-ionized water and dried at 95° C.

The products were identified as UZM-12 by powder x-ray diffraction. Characteristic lines in the x-ray diffraction patterns for each of these materials are given in Table 10. Elemental analysis of the 175° C.-1 day product gave mole ratios of: Si/Al=6.44, K/Al=0.41, N/Al=0.87, and C/N=5.61; while the 175° C.-2 day product had ratios of: Si/Al=7.63, K/Al=0.36, N/Al=0.97, and C/N=5.99.

TABLE 10

| 175° C.-1 day | | | 175° C.-2 days | | |
|---|---|---|---|---|---|
| 2-Θ | d (Å) | I/Io (%) | 2-Θ | d (Å) | I/Io (%) |
| 7.74 | 11.41 | s | 7.80 | 11.33 | m |
| 9.72 | 9.09 | m | 9.76 | 9.06 | m |
| 11.66 | 7.58 | w | 11.64 | 7.59 | w |
| 13.58 | 6.52 | m | 13.54 | 6.53 | m |
| 14.05 | 6.30 | w | 13.96 | 6.34 | w |
| 15.66 | 5.65 | m | 15.64 | 5.66 | m |
| 16.76 | 5.29 | m | 16.70 | 5.30 | w |
| 19.62 | 4.52 | s | 19.58 | 4.53 | m |
| 20.76 | 4.27 | m | 20.74 | 4.28 | m |
| 21.56 | 4.12 | m | 21.66 | 4.10 | m |
| 23.60 | 3.77 | vs | 23.62 | 3.76 | vs |
| 23.86 | 3.73 | vs | 24.70 | 3.60 | m |
| 24.74 | 3.60 | s | 27.32 | 3.26 | m |
| 27.24 | 3.27 | m | 28.34 | 3.15 | w |
| 28.36 | 3.14 | m | 31.58 | 2.83 | m |
| 30.74 | 2.91 | w | 32.18 | 2.78 | m |
| 31.56 | 2.83 | m | 33.92 | 2.64 | w |
| 32.14 | 2.78 | m | 36.46 | 2.46 | w |
| 33.80 | 2.65 | w | 47.96 | 1.90 | w |
| 36.38 | 2.47 | m | 50.39 | 1.81 | w |
| 39.85 | 2.26 | w | | | |
| 43.18 | 2.09 | w | | | |
| 43.92 | 2.06 | w | | | |
| 46.21 | 1.96 | w | | | |
| 48.16 | 1.89 | w | | | |
| 50.28 | 1.81 | w | | | |
| 51.80 | 1.76 | w | | | |

EXAMPLE 10

An aluminosilicate solution was prepared by mixing 48.93 g of aluminum sec-butoxide (95+%) and 404.0 g TPAOH (40%) solution followed by the addition of 300.0 g of colloidal silica, (Ludox AS-40, 40% SiO$_2$). The reaction mixture was homogenized for 1 hour and then aged in a 1 liter Teflon bottle for 20 hours at 95° C. Elemental analysis of the resulting solution indicated a Si content of 7.58 wt %.

To a 100.00 g portion of this reaction mixture there was added (dropwise) a solution consisting of 11.89 g of tetramethylene bis(trimethylammonium) diiodide dissolved in 13.4 g de-ionized water. A KOH solution (0.78 g KOH (88%) pellets dissolved in 3.0 g de-ionized water) was then added dropwise. The homogenized reaction mixture was distributed among 5 Teflon lined autoclaves and the mixtures reacted at 125° C. for 4 and 7 days, 150° C. for 2 and 5 days, and 175° C. for 2 days. The solid products were recovered by centrifugation, washed with de-ionized water and dried at 95° C.

The products resulting from the reactions at 125° C. for 4 and 7 days, and at 150° for 2 days were identified as pure UZM-12 via powder x-ray diffraction. Characteristic lines in the diffraction patterns for the 125° C.-7 day and the 150° C.-2 day preparations are shown in Table 11. The corresponding product compositions are Si/Al=6.51, K/Al=0.38, N/Al=1.17, and C/N=5.69 7 day-125° C. preparation and Si/Al=7.38, K/Al=0.37, N/Al=1.14, and C/N=5.06 for the 2 day-150° C. preparation. Scanning Electron Microscopy (SEM) showed the latter material to be significantly smaller than 100 nm, too small to determine morphology. A portion of the 150° C. product was calcined under a flow of air for 6 hours at 550° C. Nitrogen adsorption studies yielded a BET surface area of 535 m$^2$/g and a micropore volume of 0.18 cc/g.

TABLE 11

| 125° C.-7 day | | | 150° C.-2 day | | |
|---|---|---|---|---|---|
| 2-Θ | d (Å) | I/Io (%) | 2-Θ | d (Å) | I/Io (%) |
| 7.82 | 11.30 | vs | 7.78 | 11.35 | s |
| 9.86 | 8.97 | w | 9.89 | 8.93 | w |
| 11.86 | 7.46 | m | 11.66 | 7.59 | w |
| 13.62 | 6.50 | m | 13.66 | 6.48 | m |
| 14.12 | 6.27 | w | 14.20 | 6.23 | w |
| 15.64 | 5.66 | w | 15.76 | 5.62 | m |
| 16.76 | 5.29 | w | 16.86 | 5.26 | m |
| 19.52 | 4.54 | s | 19.56 | 4.53 | s |
| 20.65 | 4.30 | w | 20.82 | 4.26 | m |
| 21.50 | 4.13 | m | 21.68 | 4.10 | m |
| 23.44 | 3.79 | m | 23.76 | 3.74 | vs |
| 23.78 | 3.74 | vs | 24.61 | 3.61 | w |
| 25.00 | 3.56 | vs | 24.98 | 3.56 | vs |
| 27.46 | 3.25 | m | 27.38 | 3.25 | m |
| 28.63 | 3.12 | w | 28.50 | 3.13 | w |
| 31.62 | 2.83 | s | 30.84 | 2.90 | w |
| 33.67 | 2.66 | w | 31.70 | 2.82 | s |
| 36.38 | 2.47 | w | 32.28 | 2.77 | m |
| 43.15 | 2.10 | w | 33.98 | 2.64 | w |
| 48.56 | 1.87 | w | 36.40 | 2.47 | w |
| 52.00 | 1.76 | w | 36.56 | 2.46 | w |
| | | | 36.64 | 2.45 | w |
| | | | 48.53 | 1.87 | w |

EXAMPLE 11

This example is identical to example 2, except that half of the tetramethylene bis(trimethylammonium) diiodide was employed. All of the products isolated from the 125° C. reactions (3, 5, and 7 days) yielded pure UZM-12. Characteristic diffraction lines for the 7-day material are shown in Table 12. The composition of this product consisted of the following elemental mole ratios: Si/Al=6.09, K/Al=0.39, N/Al=1.15, and C/N=4.78. Scanning Electron Microscopy (SEM) showed the material to be too small to determine crystallite morphology. A portion of this product was calcined under a flow of air for 6 hours at 550° C. The BET surface area was 644 m$^2$/g and the micropore volume was 0.19 cc/g.

TABLE 12

| 2-Θ | d (Å) | I/Io (%) |
|---|---|---|
| 7.72 | 11.44 | vs |
| 9.82 | 9.00 | w |
| 11.80 | 7.49 | w |
| 13.50 | 6.55 | m |
| 15.72 | 5.63 | m |
| 16.72 | 5.30 | m |
| 19.56 | 4.53 | s |
| 20.74 | 4.28 | w |
| 21.52 | 4.13 | m |
| 23.88 | 3.72 | s |
| 25.00 | 3.56 | m |
| 27.36 | 3.26 | m |
| 28.48 | 3.13 | m |
| 31.74 | 2.82 | s |
| 33.52 | 2.67 | w |
| 36.32 | 2.47 | m |
| 48.50 | 1.88 | w |
| 52.08 | 1.75 | w |

EXAMPLE 12

An aluminosilicate solution was prepared by mixing aluminum sec-butoxide (95+%), 34.01 g, and 458.60 g of methyltriethyl ammonium hydroxide (MeTEAOH, 20%), followed by the addition of 206.76 g colloidal silica, (Ludox AS-40, 40% $SiO_2$) and 0.81 g deionized water. The reaction mixture was homogenized for 1 hr and then aged in a Teflon™ bottle overnight at 95° C. Elemental analysis of the resulting solution gave a silicon content of 5.65 wt %.

To a 66.44 g portion of this reaction mixture there was added a solution consisting of 4.83 g hexamethonium bromide and 0.83 g KOH (88%) dissolved in 17.89 g deionized water. After 15 minutes of mixing the reaction mixture was distributed among 4 Teflon™-lined autoclaves. The reaction mixtures in the autoclaves were digested at 125° C. and 150° C. for 3 and 5 days under autogenous pressures. The solid products were isolated by centrifugation, washed with de-ionized water, and dried at 50°.

Characterization of the 125° C., 5 day product by powder x-ray diffraction identified it as UZM-12. Characteristic diffraction lines for the material are shown in Table 13. The composition of this material was determined to be Si/Al=5.97; K/Al=0.38; N/Al=0.87 and C/N=6.10.

TABLE 13

| 2-Θ | d (Å) | I/Io (%) |
|---|---|---|
| 7.74 | 11.41 | m |
| 9.68 | 9.13 | m |
| 11.68 | 7.57 | w |
| 13.44 | 6.58 | w |
| 14.02 | 6.31 | w |
| 15.54 | 5.70 | m |
| 16.62 | 5.33 | w |
| 17.78 | 4.98 | w |
| 19.46 | 4.56 | m |
| 20.64 | 4.30 | m |
| 21.42 | 4.15 | m |
| 23.48 | 3.79 | s |
| 23.72 | 3.75 | vs |
| 24.70 | 3.60 | m |
| 27.16 | 3.28 | m |
| 28.26 | 3.16 | w |
| 30.66 | 2.91 | w |
| 31.46 | 2.84 | s |
| 32.04 | 2.79 | m |
| 33.64 | 2.66 | w |
| 36.26 | 2.48 | m |
| 41.20 | 2.19 | w |
| 43.06 | 2.10 | w |
| 43.72 | 2.07 | w |
| 46.00 | 1.97 | w |
| 48.16 | 1.89 | w |
| 50.12 | 1.82 | w |
| 51.72 | 1.77 | w |

EXAMPLE 13

An aluminosilicate solution was prepared by adding 33.96 g of aluminum sec-butoxide (95+%) to 458.57 g MeTEAOH (20%). To this mixture, 206.74 g colloidal silica, (Ludox AS-40, 40% $SiO_2$) was added, followed by the addition of 0.79 g deionized water. The reaction mixture was mixed for 1 hr and then aged in a Teflon™ bottle overnight at 95° C. Elemental analysis of the resulting solution gave a silicon content of 5.69 wt %.

To a 98.77 g portion of this reaction mixture there was added a solution of 7.44 g hexamethonium bromide and 1.32 g KOH (88%) in 27.52 g deionized water. The reaction mixture was divided among two Teflon™-lined autoclave and the mixtures reacted at 125° C. for 5 days at autogenous pressure. The solid products were combined and isolated by centrifugation, washed with de-ionized water, and dried at 50° C.

The product of the reaction exhibited the x-ray diffraction pattern of UZM-12. Characteristic lines in the x-ray diffraction pattern for this material are given in Table 14. Elemental analysis showed the product to consist of the elemental mole ratios: Si/Al=5.84; K/Al=0.39; N/Al=0.81 and C/N=6.11.

A portion of the product was heated to 520° C. under a flow of nitrogen at which point the atmosphere was switched to air and the sample held there for 6 hours. The calcined product was then cooled and then ammonium exchanged three times for two hours each using $NH_4NO_3$ at 70° C. and dried at 50° C. The resulting product was then heated to 550° C. under a flow of nitrogen and held at 550° C. for 2 hrs under flouring air. The final product exhibited the x-ray diffraction pattern of UZM-12. Characteristic diffraction lines for this material are given in table 14. The final product had a BET surface area of 487 $m^2$/g and a micropore volume of 0.217 cc/g. Elemental analysis showed the Si/Al ratio to be 5.85, while the K/Al ratio was reduced to 0.15.

TABLE 14

| As-synthesized | | | Calcined, $NH_4^+$ exchanged, calcined | | |
|---|---|---|---|---|---|
| 2-Θ | d (Å) | I/Io (%) | 2-Θ | d (Å) | I/Io (%) |
| 7.70 | 11.47 | vs | 7.80 | 11.33 | vs |
| 9.68 | 9.13 | m | 9.72 | 9.09 | m |
| 11.66 | 7.58 | w | 11.76 | 7.52 | m |
| 13.38 | 6.61 | m | 13.54 | 6.53 | vs |
| 13.95 | 6.34 | w | 14.10 | 6.28 | m |
| 15.50 | 5.71 | m | 15.66 | 5.65 | m |
| 16.60 | 5.34 | m | 16.64 | 5.32 | m |
| 17.82 | 4.97 | w | 19.25 | 4.61 | w |
| 19.44 | 4.56 | s | 19.58 | 4.53 | m |
| 20.58 | 4.31 | m | 20.78 | 4.27 | m |
| 21.46 | 4.14 | m | 21.64 | 4.10 | m |
| 23.38 | 3.80 | vs | 23.56 | 3.77 | s |
| 23.76 | 3.74 | vs | 23.92 | 3.72 | vs |
| 24.76 | 3.59 | s | 24.94 | 3.57 | s |
| 27.12 | 3.29 | m | 27.34 | 3.26 | m |
| 28.30 | 3.15 | m | 28.50 | 3.13 | m |
| 30.64 | 2.92 | w | 30.80 | 2.90 | w |
| 31.38 | 2.85 | m | 31.66 | 2.82 | vs |
| 31.96 | 2.80 | m | 32.14 | 2.78 | m |
| 33.54 | 2.67 | m | 33.82 | 2.65 | w |
| 36.14 | 2.48 | m | 36.58 | 2.46 | w |
| 39.48 | 2.28 | w | 41.44 | 2.18 | w |
| 41.20 | 2.19 | w | 46.28 | 1.96 | w |
| 42.98 | 2.10 | w | 48.50 | 1.88 | w |
| 45.94 | 1.97 | w | | | |
| 48.10 | 1.89 | w | | | |
| 50.10 | 1.82 | w | | | |
| 51.58 | 1.77 | w | | | |

EXAMPLE 14

An aluminosilicate reaction mixture was prepared by mixing 123.0 g aluminum tri sec-butoxide in 1344.6 g TEAOH. To this mixture 1039.1 g de-ionized water was added, followed by the addition of 1200 g colloidal silica. The reaction mixture was mixed for an hour, placed in four 1-liter Teflon™ bottles, and aged for 3 days at 95° C. Elemental analysis determined the Si content to be 6.29%, while the Al content was 0.38%, giving a Si/Al ratio of 15.9. This solution was used in the next 3 reactions.

Three similar aluminosilicate reaction mixtures were prepared that varied only in the potassium level employed. In each of the reaction mixtures, 142.86 g of the above aluminosilicate solution was mixed with 54.18 g TEAOH (35%) and a solution containing 14.58 g hexamethonium bromide dissolved in 25.0 g de-ionized water. To each of these reaction mixtures different amounts of a KCl solution were added; 1.5 g KCl dissolved in 7.5 g de-ionized water was added to reaction 1; 3.0 g KCl dissolved in 15.0 g de-ionized water was added to reaction 2; and 6.0 g KCl dissolved in 25.0 g de-ionized water was added to reaction 3. This corresponds to K/Al ratios of 1, 2, and 4 for Reactions 1, 2, and 3 respectively. All of the reaction mixtures were transferred to Teflon™-lined autoclaves and reacted under a variety of conditions, including 125° C. for 7 days. The solid products were isolated by filtration, washed with de-ionized water, and dried at 95° C.

All three of the 125° C.-7 day products from reactions 1, 2, and 3 were identified as UZM-12 by powder x-ray diffraction. Samples from reactions 1, 2 and 3 were analyzed by SEM and showed that as the potassium concentration is increased the crystallite size increases and the morphology changes. At K/Al=1 the crystallites are 200-300 nm spheroids with slight elongation while at K/Al=4 the crystallites are greater than 1 micron long and quite elongated.

Finally, a reaction mixture similar to reaction mixture 3 but with tetramethylene bis (trimethylammonium) diiodide instead of hexamethanium bromide gave crystallites of about 1 micron long but with a needle-like morphology. The x-ray diffraction pattern of this sample is shown in the drawing.

What is claimed is:

1. A microporous crystalline zeolite having a three dimensional structure comprised of at least $AlO_2$ and $SiO_2$ tetrahedral units and having a composition in the as-synthesized and anhydrous form in terms of mole ratios of the elements given by

where M is at least one exchangeable cation selected from the group consisting of alkali and alkaline earth metals, "m" is the mole ratio of M to (Al+E) and varies from 0 to about 0.50, R is at least one organo ammonium cation selected from the group consisting of quaternary ammonium cations, protonated amines, protonated diamines, protonated alkanolamines, diquaternary ammonium cations, quaternized alkanolammonium cations and mixtures thereof, "r" is the mole ratio of R to (Al+E) and has a value of about 0.51 to about 3.0, E is an element selected from the group consisting of Ga, Fe, In, Cr, B, and mixtures thereof "x" is the mole fraction of E and varies from 0 to about 1.0, "n" is the weighted average valence of M and has a value of about +1 to about +2, "p" is the weighted average valence of R and has a value of +1 to about +2, "y" is the mole ratio of Si to (Al+E) and has a value from greater than 5.5 to about 9 and "z" is the mole ratio of O to (Al+E) and has a value determined by the equation:

$$z = (m \cdot n + r \cdot p + 3 + 4 \cdot y)/2;$$

the zeolite characterized in that it has an x-ray diffraction pattern having at least the d-spacings and relative intensities set forth in Table A:

TABLE A

| 2Θ | d (Å) | I/Io (%) |
|---|---|---|
| 7.5-7.99 | 11.78-11.06 | m-vs |
| 9.54-10.06 | 9.26-8.79 | w-m |
| 11.5-12.1 | 7.69-7.31 | w-m |
| 13.25-13.79 | 6.68-6.42 | w-vs |
| 15.35-15.95 | 5.77-5.55 | w-m |
| 16.47-16.99 | 5.38-5.21 | w-m |
| 19.33-19.8 | 4.59-4.48 | m-vs |
| 20.45-20.96 | 4.34-4.23 | w-m |
| 21.31-21.83 | 4.17-4.07 | w-m |
| 23.2-23.9 | 3.83-3.72 | m-vs* |
| 23.55-24.25 | 3.77-3.67 | s-vs* |
| 24.55-25.3 | 3.62-3.52 | m-vs |
| 26.85-27.6 | 3.32-3.23 | w-m |
| 28.15-28.85 | 3.17-3.09 | w-m |
| 31.22-31.94 | 2.86-2.8 | m-vs |
| 33.37-34.15 | 2.68-2.62 | w-m |
| 36.05-36.49 | 2.49-2.46 | w-m* |
| 36.36-36.71 | 2.47-2.45 | w-m* |

*Adjacent peaks can coalesce, showing one peak

2. The zeolite of claim 1 where M is selected from the group consisting of sodium, potassium, strontium, barium and mixtures thereof.

3. The zeolite of claim 2 where M is potassium.

4. The zeolite of claim 1 where R is selected from the group consisting of tetrapropylammonium cation, tetraethylammonium cation, hexamethonium cation, tetramethylene bis (trimethylammonium) cation, benzyltrimethyl ammonium cation and mixtures thereof.

5. The zeolite of claim 1 further characterized in that the zeolite comprises crystallites having an average diameter of about 15 to about 50 nanometers.

6. The zeolite of claim 5 further characterized in that the zeolite comprises crystallites having a spheroidal geometry.

7. The zeolite of claim 1 further characterized in that the zeolite comprises crystallites having a spheroidal geometry.

8. A process for preparing a microporous crystalline zeolite having a three dimensional structure comprised of at least $AlO_2$ and $SiO_2$ tetrahedral units and having a composition in the as-synthesized and anhydrous form in terms of mole ratios of the elements given by

where M is at least one exchangeable cation selected from the group consisting of alkali and alkaline earth metals, "m" is the mole ratio of M to (Al+E) and varies from 0 to about 0.50, R is at least one organo ammonium cation selected from the group consisting of quaternary ammonium cations, protonated amines, protonated diamines, protonated alkanolamines, diquaternary ammonium cations, quaternized alkanolammonium cations and mixtures thereof, "r" is the mole ratio of R to (Al+E) and has a value of about 0.51 to about 3.0, E is an element selected from the group consisting of Ga, Fe, In, Cr, B, and mixtures thereof "x" is the mole fraction of E and varies from 0 to about 1.0, "n" is the weighted average valence of M and has a value of about +1 to about +2, "p" is the weighted average valence of R and has a value of +1 to about +2, "y" is the mole ratio of Si to (Al+E) and has a value from greater than 5.5 to about 9 and "z" is the mole ratio of O to (Al+E) and has a value determined by the equation:

$$z = (m \cdot n + r \cdot p + 3 + 4 \cdot y)/2;$$

the zeolite characterized in that it has an x-ray diffraction pattern having at least the d-spacings and relative intensities set forth in Table A:

TABLE A

| 2Θ | d (Å) | I/Io (%) |
|---|---|---|
| 7.5-7.99 | 11.78-11.06 | m-vs |
| 9.54-10.06 | 9.26-8.79 | w-m |
| 11.5-12.1 | 7.69-7.31 | w-m |
| 13.25-13.79 | 6.68-6.42 | w-vs |
| 15.35-15.95 | 5.77-5.55 | w-m |
| 16.47-16.99 | 5.38-5.21 | w-m |
| 19.33-19.8 | 4.59-4.48 | m-vs |
| 20.45-20.96 | 4.34-4.23 | w-m |
| 21.31-21.83 | 4.17-4.07 | w-m |
| 23.2-23.9 | 3.83-3.72 | m-vs* |
| 23.55-24.25 | 3.77-3.67 | s-vs* |
| 24.55-25.3 | 3.62-3.52 | m-vs |
| 26.85-27.6 | 3.32-3.23 | w-m |
| 28.15-28.85 | 3.17-3.09 | w-m |
| 31.22-31.94 | 2.86-2.8 | m-vs |
| 33.37-34.15 | 2.68-2.62 | w-m |
| 36.05-36.49 | 2.49-2.46 | w-m* |
| 36.36-36.71 | 2.47-2.45 | w-m* |

*Adjacent peaks can coalesce, showing one peak

The process comprising forming a reaction mixture containing reactive sources of M, R, Al, Si and optionally E and heating the reaction mixture at a temperature of about 80° C. to about 200° C., for a time sufficient to form the zeolite the reaction mixture having a composition expressed in terms of mole ratios of the oxides of:

$$aM_{2/n}O:bR_{2/p}O:(1-c)Al_2O_3:cE_2O_3:dSiO_2:eH_2O$$

where "a" has a value of 0 to about 1.25, "b" has a value of about 2 to about 120, "c" has a value of 0 to about 1.0, "d" has a value of about 8 to about 60, and "e" has a value of about 40 to about 9000.

9. The process of claim 8 where M is selected from the group consisting of sodium, potassium, strontium, barium and mixtures thereof.

10. The process of claim 8 where the source of M is selected from the group consisting of halide, nitrate, sulfate, hydroxide, or acetate compounds.

11. The process of claim 8 where the aluminum source is selected from the group consisting of aluminum isopropoxide, aluminum sec-butoxide, precipitated alumina and aluminum metal.

12. The process of claim 8 where the silicon source is selected from the group consisting of tetraethylorthosilicate, colloidal silica, fumed silica and precipitated silica.

13. The process of claim 8 where the E source is selected from the group consisting of alkali borates, boric acid, gallium oxyhydroxide, gallium sulfate, ferric sulfate, ferric chloride, chromium nitrate, indium chloride and mixtures thereof.

14. The process of claim 8 where R is selected from the group consisting of tetrapropylammonium cation, tetraethylammonium cation, hexamethonium cation, tetramethylene bis (trimethylammonium) cation, benzyltrimethyl ammonium cation and mixtures thereof.

15. The process of claim 8 where the source of R is the halide or hydroxide compounds of R.

16. The process of claim 8 characterized in that the reaction mixture is prepared by first preparing a solution comprising sources of Al, Si and at least a portion of the R source and adding to it source of M and an additional amount of the R source to produce the reaction mixture.

17. A microporous crystalline zeolite (UZM-12HS) having a three dimensional structure comprised of at least $AlO_2$ and $SiO_2$ tetrahedral units having an empirical composition on an anhydrous basis in terms of mole ratios of the elements of:

$$M1_a^{n+}Al_{(1-x)}E_xSi_{y'}O_{z''}$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from 0.01 to about 3.5, E is an element selected from the group consisting of gallium, iron, boron, chromium, indium and mixtures thereof, x is the mole fraction of E and varies from 0 to about 1.0, n is the weighted average valence of M1 and has a value of about +1 to about +3, y' is the mole ratio of Si to (Al+E) and is greater than about 5.75 and z'' is the mole ratio of O to (Al+E) and has a value determined by the equation:

$$z''=(a \cdot n+3+4 \cdot y')/2.$$

18. The zeolite of claim 17 where M1 is selected from the group consisting of potassium, sodium, hydrogen ion, ammonium ion, strontium ion, barium ion, lanthanum ion, calcium ion magnesium ion and mixtures thereof.

19. The zeolite of claim 17 where y' has a value of about 5.75 to about 20,000.

20. A process for preparing a modified microporous crystalline zeolite having a three dimensional structure comprised of at least $AlO_2$ and $SiO_2$ tetrahedral units having an empirical composition on an anhydrous basis in terms of mole ratios of the elements of:

$$M1_a^{n+}Al_{(1-x)}E_xSi_{y'}O_{z''}$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from 0.01 to about 3.5, E is an element selected from the group consisting of gallium, iron, boron, chromium, indium and mixtures thereof, x is the mole fraction of E and varies from 0 to about 1.0, n is the weighted average valence of M1 and has a value of about +1 to about +3, y' is the mole ratio of Si to (Al+E) and is greater than about 5.75 and z'' is the mole ratio of O to (Al+E) and has a value determined by the equation:

$$z''=(a \cdot n+3+4 \cdot y')/2.$$

The process comprising treating a starting zeolite at treating conditions thereby removing at least a portion of the framework aluminum and optionally inserting silicon into the framework to provide the modified zeolite; the starting zeolite having an empirical formula on an anhydrous basis of:

$$M'_m{}^{n+}R_{r'}{}^{p+}Al_{(1-x)}E_xSi_yO_{z'}$$

where M' is an exchangeable cation selected from the group consisting of ammonium ion, hydrogen ion, alkali metals, alkaline earth metals, rare earth metals and mixtures thereof, n is the weighted average valence of M' and varies from +1 to about +3, m' is the mole ratio of M' to (Al+E) and varies from 0 to about 3.5, R is at least one organoammonium cation selected from the group consisting of protonated amines, protonated diamines, protonated alkanolamines, quaternary ammonium ions, diquartemary ammonium ions, quaternized alkanolammonium ions and mixtures thereof, p is the average weighted valence of the organic cation and varies from about +1 to about +2, r' is the mole ratio of R to (Al+E) and varies from 0 to about 3.5, r'+m'>0, y' is the ratio of Si to (Al+E) and varies from greater than 5.5 to about 9 and z' is the mole ratio of O to (Al+E) and has a value given by the equation:

$$z'=(m'\cdot n+r'\cdot p+3+4\cdot y')/2.$$

21. The process of claim 20 where the treating step is selected from the group consisting of treatment with a fluorosilicate solution or slurry, extraction with a weak, strong or complexing acid, calcination plus ion-exchange, steaming plus acid extraction and calcination plus acid extraction and mixtures thereof.

22. The process of claim 21 where the fluorosilicate treatment comprises contacting the starting zeolite with a fluorosilicate solution or slurry at a pH of about 3 to about 7, a temperature of about 10° C. to about 100° C. and a time sufficient to remove at least a portion of the aluminum from the framework and insert silicon into the framework.

23. The process of claim 21 where the acid extraction treatment comprises contacting the starting zeolite with an acid at a temperature of about 10° C. to about 100° C. for a time of about 10 minutes to about 24 hours.

24. The process of claim 21 where the calcination treatment comprises heating a starting zeolite to a temperature of about 300° C. to about 600° C. for a time of about 2 to about 24 hours.

25. The process of claim 21 where the steaming treatment comprises steaming a starting zeolite at a temperature of about 400° C. to about 850° C. with from about 1% to about 100% stream, for a time of about 10 minutes to about 48 hours.

26. The process of claim 21 where the acid is selected from the group consisting of nitric acid, sulfuric acid, EDTA, citric acid, oxalic acid and mixtures thereof.

27. The process of claim 21 further comprising taking the modified zeolite and treating it using at least one treatment selected from the group consisting of steaming, calcining, ion exchange.

28. A hydrocarbon conversion process comprising contacting a hydrocarbon with a catalytic composite at hydrocarbon conversion conditions to give a converted product, the catalytic composite comprising a microporous crystalline zeolite selected from the group consisting of UZM-12, UZM-12HS and mixtures thereof wherein UZM-12 has a composition in the as-synthesized and anhydrous form in terms of mole ratios of the elements given by:

$$M_m^{n+}R_r^{p+}Al_{(1-x)}E_xSi_yO_z \qquad (1)$$

where M is at least one exchangeable cation selected from the group consisting of alkali and alkaline earth metals, "m" is the mole ratio of M to (Al+E) and varies from 0 to about 0.50, R is at least one organo ammonium cation selected from the group consisting of quaternary ammonium cations, protonated amines, protonated diamines, protonated alkanolamines, diquaternary ammonium cations, quaternized alkanolammonium cations and mixtures thereof, "r" is the mole ratio of R to (Al+E) and has a value of about 0.51 to about 3.0, E is an element selected from the group consisting of Ga, Fe, In, Cr, B, and mixtures thereof "x" is the mole fraction of E and varies from 0 to about 1.0, "n" is the weighted average valence of M and has a value of about +1 to about +2, "p" is the weighted average valence of R and has a value of +1 to about +2, "y" is the mole ratio of Si to (Al+E) and has a value from greater than 5.5 to about 9 and "z" is the mole ratio of O to (Al+E) and has a value determined by the equation:

$$z=(m\cdot n+r\cdot p+3+4\cdot y)/2;$$

the zeolite characterized in that it has an x-ray diffraction pattern having at least the d-spacings and relative intensities set forth in Table A:

TABLE A

| 2Θ | d (Å) | I/Io (%) |
|---|---|---|
| 7.5-7.99 | 11.78-11.06 | m-vs |
| 9.54-10.06 | 9.26-8.79 | w-m |
| 11.5-12.1 | 7.69-7.31 | w-m |
| 13.25-13.79 | 6.68-6.42 | w-vs |
| 15.35-15.95 | 5.77-5.55 | w-m |
| 16.47-16.99 | 5.38-5.21 | w-m |
| 19.33-19.8 | 4.59-4.48 | m-vs |
| 20.45-20.96 | 4.34-4.23 | w-m |
| 21.31-21.83 | 4.17-4.07 | w-m |
| 23.2-23.9 | 3.83-3.72 | m-vs* |
| 23.55-24.25 | 3.77-3.67 | s-vs* |
| 24.55-25.3 | 3.62-3.52 | m-vs |
| 26.85-27.6 | 3.32-3.23 | w-m |
| 28.15-28.85 | 3.17-3.09 | w-m |
| 31.22-31.94 | 2.86-2.8 | m-vs |
| 33.37-34.15 | 2.68-2.62 | w-m |
| 36.05-36.49 | 2.49-2.46 | w-m* |
| 36.36-36.71 | 2.47-2.45 | w-m* |

*Adjacent peaks can coalesce, showing one peak and UZM-12HS has a composition on an anhydrous basis in terms of mole ratios of the elements given by:

$$M1_a^{n+}Al_{(1-x)}E_xSi_yO_{z''}$$

where M1 is at least one exchangeable cation selected from the group consisting of alkali metals, alkaline earth metals, rare earth metals, ammonium ion, hydrogen ion and mixtures thereof, a is the mole ratio of M1 to (Al+E) and varies from 0.01 to about 3.5, E is an element selected from the group consisting of gallium, iron, boron, chromium, indium and mixtures thereof, x is the mole fraction of E and varies from 0 to about 1.0, n is the weighted average valence of M1 and has a value of about +1 to about +3, y' is the mole ratio of Si to (Al+E) and is greater than about 5.75 and z" is the mole ratio of O to (Al+E) and has a value determined by the equation:

$$z''=(a\cdot n+3+4y')/2.$$

* * * * *